United States Patent
Fendt

(10) Patent No.: US 10,046,804 B2
(45) Date of Patent: Aug. 14, 2018

(54) METHOD AND DEVICE FOR SAFELY PARKING A VEHICLE

(71) Applicant: Conti Temic microelectronic GmbH, Nuremberg (DE)

(72) Inventor: Guenter Anton Fendt, Schrobenhausen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 109 days.

(21) Appl. No.: 15/113,126

(22) PCT Filed: Jan. 28, 2015

(86) PCT No.: PCT/DE2015/200038
§ 371 (c)(1),
(2) Date: Jul. 21, 2016

(87) PCT Pub. No.: WO2015/117611
PCT Pub. Date: Aug. 13, 2015

(65) Prior Publication Data
US 2016/0332667 A1 Nov. 17, 2016

(30) Foreign Application Priority Data
Feb. 10, 2014 (DE) .................. 10 2014 202 324

(51) Int. Cl.
*G01C 22/00* (2006.01)
*B62D 15/02* (2006.01)
*B60W 30/06* (2006.01)

(52) U.S. Cl.
CPC ......... *B62D 15/0285* (2013.01); *B60W 30/06* (2013.01); *B62D 15/027* (2013.01)

(58) Field of Classification Search
CPC . B60T 2201/10; B62D 15/028; B62D 15/027; B62D 15/0285; B62D 9/00;
(Continued)

(56) References Cited

U.S. PATENT DOCUMENTS 5,586,031 A * 12/1996 Fussl ..................... B62D 7/142
180/197
7,075,456 B2 * 7/2006 Tanaka ................. B62D 15/028
340/932.2

(Continued)

FOREIGN PATENT DOCUMENTS

DE  102010001922  0/2011
DE  102008046367  3/2010
(Continued)

OTHER PUBLICATIONS

International Search Report of the International Searching Authority for International Application PCT/DE2015/200038, dated Oct. 7, 2015, 3 pages, European Patent Office, HV Rijswijk, Netherlands.

(Continued)

*Primary Examiner* — Khoi H Tran
*Assistant Examiner* — Jorge O Peche
(74) *Attorney, Agent, or Firm* — W. F. Fasse

(57) ABSTRACT

In a method and a device for safely parking a vehicle, an actual distance of the vehicle from a road edge fixture is monitored relative to a specified minimum distance value during a manual or automatic parking maneuver, and upon completion of the parking maneuver, at least two wheels of the vehicle are automatically controlled to turn toward the road edge fixture in the direction of travel dependent on the actual distance relative to the specified minimum distance value.

16 Claims, 2 Drawing Sheets

(58) Field of Classification Search
CPC .......... B60W 10/20; B60R 2300/806; B60R 2300/8086; G08G 1/168
See application file for complete search history.

(56) References Cited

U.S. PATENT DOCUMENTS

| | | | | |
|---|---|---|---|---|
| 7,378,988 B2* | 5/2008 | Nordbruch | ............... | B60Q 9/00 180/282 |
| 7,640,108 B2* | 12/2009 | Shimizu | ............... | B60K 35/00 180/204 |
| 8,953,043 B2* | 2/2015 | Kadowaki | ............... | H04N 7/18 348/148 |
| 9,731,764 B2* | 8/2017 | Baek | ............... | B62D 15/0285 |
| 2001/0017591 A1* | 8/2001 | Kuriya | ............... | B60R 1/00 340/932.2 |
| 2001/0026317 A1* | 10/2001 | Kakinami | ............... | B60Q 9/005 348/148 |
| 2002/0084916 A1* | 7/2002 | Shimizu | ............... | B60Q 9/005 340/932.2 |
| 2002/0128750 A1* | 9/2002 | Kakinami | ............... | B60Q 9/005 701/1 |
| 2003/0080877 A1* | 5/2003 | Takagi | ............... | B60R 1/00 340/932.2 |
| 2005/0055139 A1* | 3/2005 | Tanaka | ............... | B62D 15/028 701/1 |
| 2006/0097859 A1* | 5/2006 | Nordbruch | ............... | B60Q 9/00 340/440 |
| 2006/0136109 A1* | 6/2006 | Tanaka | ............... | B60W 40/04 701/41 |
| 2007/0010918 A1* | 1/2007 | Shimazaki | ............... | B62D 15/0275 701/1 |
| 2008/0009990 A1* | 1/2008 | Katoh | ............... | B62D 15/0285 701/36 |
| 2008/0174452 A1* | 7/2008 | Yamamoto | ............... | B62D 15/0275 340/932.2 |
| 2009/0091475 A1* | 4/2009 | Watanabe | ............... | B60Q 9/005 340/932.2 |
| 2010/0039292 A1* | 2/2010 | Scherl | ............... | B62D 15/027 340/932.2 |
| 2010/0066515 A1* | 3/2010 | Shimazaki | ............... | B60W 50/14 340/435 |
| 2010/0114432 A1* | 5/2010 | Brooks | ............... | B62D 7/224 701/41 |
| 2010/0274474 A1* | 10/2010 | Takano | ............... | B62D 15/0275 701/532 |
| 2011/0054739 A1* | 3/2011 | Bammert | ............... | B62D 15/028 701/41 |
| 2011/0121994 A1 | 5/2011 | Pampus et al. | | |
| 2011/0181441 A1* | 7/2011 | Ma | ............... | B60R 1/00 340/932.2 |
| 2011/0199236 A1* | 8/2011 | Hauber | ............... | B62D 15/027 340/932.2 |
| 2011/0210868 A1* | 9/2011 | Yano | ............... | B62D 15/027 340/932.2 |
| 2011/0276225 A1* | 11/2011 | Nefcy | ............... | B62D 15/027 701/41 |
| 2012/0287279 A1* | 11/2012 | Tanaka | ............... | G08G 1/168 348/148 |
| 2013/0046441 A1* | 2/2013 | Marczok | ............... | B60Q 9/005 701/41 |
| 2013/0162829 A1* | 6/2013 | Kadowaki | ............... | B62D 15/028 348/148 |
| 2016/0075375 A1* | 3/2016 | Yamashita | ............... | B62D 15/028 701/41 |
| 2016/0075376 A1* | 3/2016 | Tomozawa | ............... | B62D 15/0285 701/42 |
| 2016/0075377 A1* | 3/2016 | Tomozawa | ............... | B62D 15/028 701/41 |
| 2016/0107691 A1 | 4/2016 | Goldmann | | |
| 2016/0159397 A1* | 6/2016 | Baek | ............... | B62D 15/0285 701/41 |
| 2016/0207527 A1* | 7/2016 | Hiei | ............... | B60W 50/082 |
| 2017/0029028 A1* | 2/2017 | Kiyokawa | ............... | B62D 15/0285 |
| 2017/0113694 A1* | 4/2017 | Nakatsuka | ............... | B60W 10/184 |
| 2017/0166175 A1* | 6/2017 | Park | ............... | B60T 8/3205 |

FOREIGN PATENT DOCUMENTS

| | | |
|---|---|---|
| DE | 102009032542 | 1/2011 |
| DE | 102011118685 | 5/2013 |
| DE | 102012103059 | 10/2013 |
| DE | 102013212318 | 12/2014 |
| JP | 2007-237838 A | 9/2007 |
| WO | WO 2012/084502 | 6/2012 |
| WO | WO 2014/207026 | 12/2014 |

OTHER PUBLICATIONS

PCT International Preliminary Report on Patentability including English Translation of PCT Written Opinion of the International Searching Authority for International Application PCT/DE2015/200038, dated Sep. 6, 2016, 7 pages, International Bureau of WIPO, Geneva, Switzerland.

German Search Report for German Patent Application No. 10 2014 202 324.6, dated Oct. 21, 2014, 8 pages, Muenchen, Germany, with English translation, 5 pages.

* cited by examiner

METHOD AND DEVICE FOR SAFELY PARKING A VEHICLE

FIELD OF THE INVENTION

The invention relates to a method for safely parking a vehicle and to a device for implementing the method.

BACKGROUND INFORMATION

A generic method is known from DE 10 2012 103 059 A1. The latter discloses a method for safely parking a vehicle, which includes means for detecting a road edge fixture, means for automatically controlling the steering and means for detecting a parking situation. Within the framework of the method, on detection of a parking situation, i.e. when it is detected that the vehicle is in its final parking position, at least two wheels of the vehicle are automatically controlled such that they are turned towards the road edge in the direction of travel. This ensures, particularly in the case of parking situations on a slope, that in the event of the vehicle rolling away, said vehicle rolls in the direction of the edge fixture and is stopped by the latter. The edge fixture is, for example, the curbstone or curb at the road edge.

SUMMARY OF THE INVENTION

This invention is based on the identified problem that automatically turning the wheels can result in damage to the vehicle, in particular if the distance from the road edge fixture is too small, which can then result in damage to the wheels and the steering mechanism of the vehicle.

It is therefore the object of this invention to indicate an improved method and an improved device for safely parking a vehicle.

This object is achieved by a method having the features set forth herein and by a device having the features set forth herein. Advantageous embodiments of the invention are also set forth herein.

In a method according to the invention, upon completion of a parking maneuver of the vehicle, at least two wheels of the vehicle are automatically controlled to turn the wheels toward a road edge fixture in a direction of travel of the vehicle. Furthermore, during the parking maneuver, an actual distance of the vehicle from the road edge fixture is monitored relative to a specified minimum distance value with detection equipment of the vehicle. According to one embodiment of the invention, the automatic controlling of the wheels comprises turning the wheels to a lesser extent when the actual distance is finally less than the specified minimum distance value, and turning the wheels to a greater extent when the actual distance is finally greater than or equal to the specified minimum distance value. In another embodiment, the automatic controlling of the wheels comprises turning the wheels when the actual distance is finally greater than or equal to the specified minimum distance value, and not turning the wheels when the actual distance is finally less than the specified minimum distance value.

A device for implementing the method according to the invention comprises an automatic steering control device such as an automatic parking system for automatically controlling the turning of the at least two wheels of the vehicle, as well as the detection equipment configured and adapted to monitor the actual distance of the vehicle from the road edge fixture relative to the specified minimum distance value.

BRIEF DESCRIPTION OF THE DRAWINGS

In order that the invention may be clearly understood it will now be described in connection with example embodiments, with reference to the accompanying drawings, wherein.

DETAILED DESCRIPTION OF EXAMPLE EMBODIMENTS OF THE INVENTION

Figure 1:
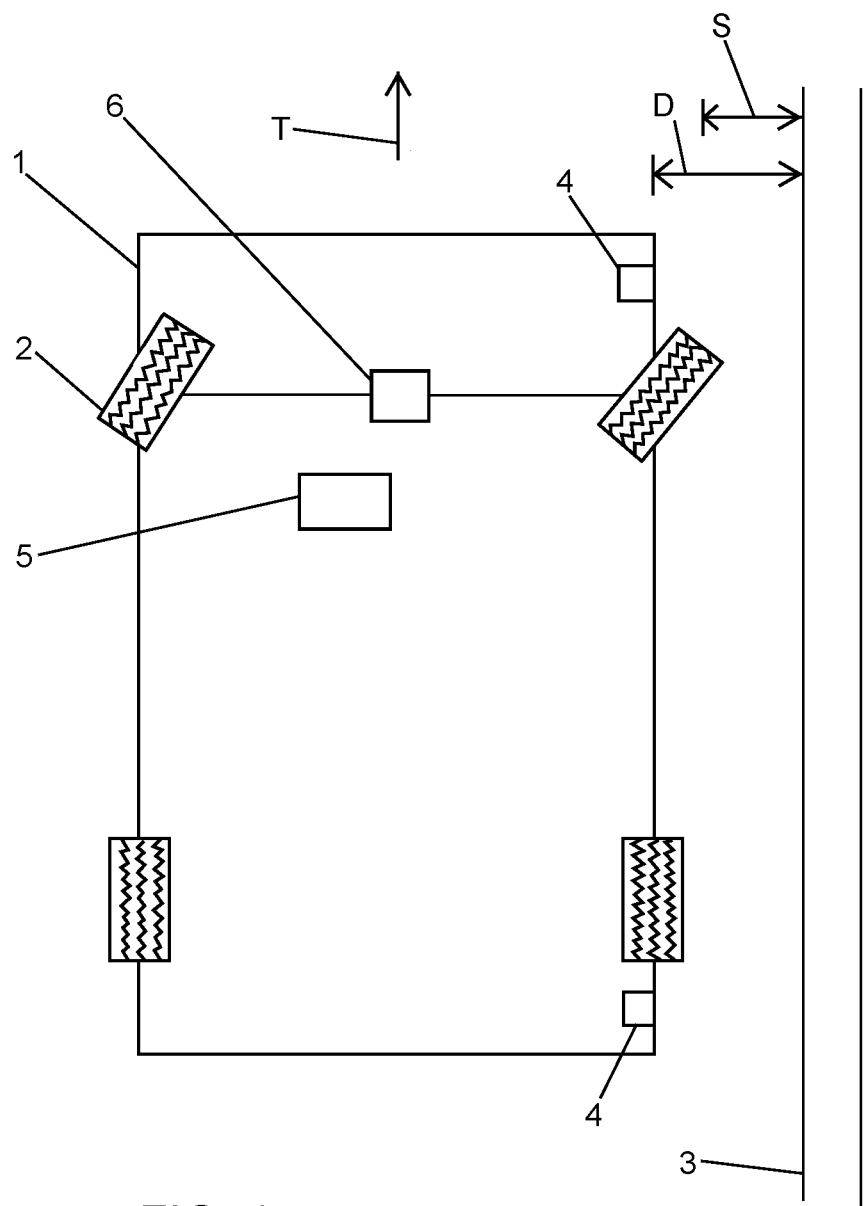
FIG. 1 is a schematic top view diagram of a vehicle equipped with an embodiment of a device for implementing the method according to the invention.
Figure 2:
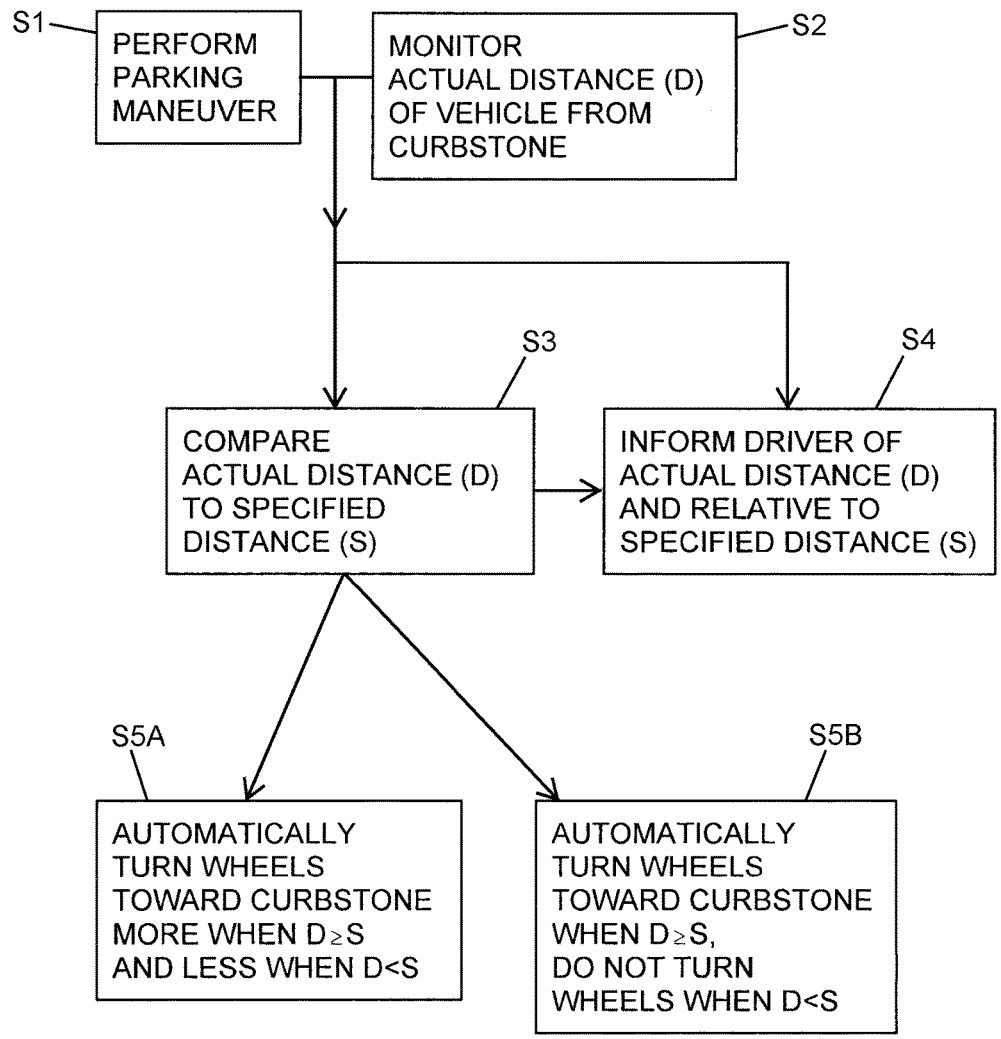
FIG. 2 is a flow diagram representing steps included in two embodiments of a method according to the invention.

Referring to FIG. 1 and FIG. 2, one underlying concept of an embodiment of the invention comprises monitoring (step S2 in FIG. 2) an actual distance D of a vehicle 1 from a road edge fixture 3 by a detection device 4 during a parking maneuver (step S1) relative to a specified minimum distance value S (step S3). The actual distance D is thereby preferably continually monitored, and the specified minimum value S thereof is preferably selected such that the vehicle's front wheels 2 can be safely turned, without the possibility of causing damage to the vehicle 1, in particular such that the wheels 2 do not touch the road edge fixture 3 upon turning. The actual distance D can thereby relate, for example, to the distance between the outermost point of the lateral vehicle trim and the outermost edge or point of the road edge fixture 3 and/or to the distance between the wheels of the vehicle, in particular when the wheels 2 are in the non-turned position in the direction of travel, and the outermost edge or point of the road edge fixture 3.

The method according to the invention is therefore used to safely park, in particular safely park by maneuvering or positioning a vehicle 1 in a parking space or parking bay (step S1), wherein it is provided within the framework of the method that upon completion of a parking maneuver, i.e. in particular on reaching a final parking position, at least two wheels 2 of the vehicle 1 are automatically controlled to turn toward the road edge in the direction of travel T. Within the framework of the method according to the invention an actual distance D of the vehicle from a road edge fixture 3 is monitored (step S2) by means of detection equipment 4 during the parking maneuver (step S1).

The invention is preferably executed in the case of a parking situation on a slope. The fact that the vehicle is parked on a slope is thereby preferably established by means of a longitudinal acceleration sensor in combination with standstill recognition. The standstill recognition is preferably executed with the aid of wheel rotation sensors. Longitudinal acceleration sensors are already used in the vehicle e.g. within the framework of ESP or occupant protection systems (activation of airbags following detection of an accident by an acceleration sensor). If the longitudinal acceleration sensor emits a value, which is above a specified threshold, when the vehicle is at a standstill, it can be envisaged that the vehicle is parked on an incline or a slope.

In a preferred embodiment of the invention, a parking situation is detected by means of one or more of the following criteria:

A parking brake lever or switch is operated by the driver.
  In a preferred embodiment of the invention, a parking situation is detected by means of additional criteria, e.g. the vehicle is stopped for longer than a given time t1 (threshold) and/or the driver unbuckles his seatbelt and/or opens the door.

An electronic parking brake of the vehicle is activated, in particular by being automatically activated.

In a preferred embodiment of the invention, a parking situation is detected by means of additional criteria, e.g. the vehicle is stopped for longer than a given time t1 (threshold), if it is detected that the vehicle is at a standstill, and the driver unbuckles his seatbelt and/or opens the door and/or if a parking maneuver which is carried out by an automatic parking assistant is completed.

It is also important to detect in which direction the wheels are to be turned. The following methods are preferably used for this purpose:

The edge fixture is detected by means of environment sensors (e.g. camera, ultrasound, etc.), It is detected by means of an analysis of a maneuver prior to the initiation of parking devices such as e.g. the parking brake, in which direction the edge fixture must be. It can therefore be assumed in the case of a parking maneuver in the direction of travel towards the right that the edge fixture is located on the right. The term 'parking maneuver' in this case denotes the entire maneuver, not just the final steering in the case of e.g. a parking maneuver involving multiple moves. Accordingly, it can be assumed in the case of a parking maneuver in the direction of travel towards the left that the edge fixture is located on the left. A parking maneuver is hereby either detected by the activation of a parking assistant or the direction in which the vehicle moved during the passage of a given period of time is generally stored, wherein this period of time can assume any value between 5 and 90 seconds. In a preferred embodiment, the period of time is approximately 10 seconds. In a particular embodiment of the invention, this information is consulted in the case of standstill recognition.

The driver indicates the direction by activating the turn signal indicator which, in particular, also switches on a parking light.

In particular, if the parking maneuver is a manual parking maneuver, i.e. a parking operation involving manual longitudinal and lateral control of the vehicle by the vehicle driver, the vehicle driver is then preferably continually informed (step S4) of the actual distance D of the vehicle from the road edge fixture 3 within the framework of the method according to the invention during the manual parking maneuver. The vehicle driver can, in this case, be informed by means of a suitable audible, visual and/or haptic output device 5, for example, regarding whether the specified value S of the minimum distance is being maintained or fallen short of, or regarding the current actual distance D from the specified value S of minimum distance which has to be maintained.

If the parking maneuver (step S1) is an automated parking maneuver, i.e. a parking operation involving at least one automated lateral control and, optionally, an automated longitudinal control of the vehicle by means of a parking assistance system, then the specified value S of the minimum distance from the road edge fixture is maintained according to the invention during the automated parking maneuver. In this case, maintaining the specified value S of the minimum distance means, in particular, maintaining the specified value S of the minimum distance upon reaching the final parking location or parking position. During the parking maneuver, i.e. during maneuvering of the vehicle into the final parking position, the actual distance D of the vehicle may be permitted to fall short of the specified minimum distance value S.

According to an advantageous embodiment of the method according to the invention, in the event that the specified minimum distance value S is fallen short of by the actual distance D, in particular in the event that said specified minimum distance value S is fallen short of in the final parking position of the vehicle, the wheels 2 are turned to a lesser extent compared with the extent to which the wheels 2 are turned when maintaining the actual distance D greater than or equal to the specified minimum distance value S (step S5A). The wheels can, in this case only be turned, for example, up to such an extent that the turned wheels 2 do not touch the road edge fixture 3.

According to another advantageous embodiment of the method according to the invention, in the event that the specified minimum distance value S is fallen short of by the actual distance D, in particular in the event that said specified minimum distance value S is fallen short of in the final parking position of the vehicle, the wheels are not turned (step S5B).

The device according to the invention includes means i.e. an automatic steering control device 6 for automatically controlling the steering of the vehicle and is used to implement the method according to the invention, in particular according to one of the embodiments described above. According to the invention the device includes, for this purpose, at least one device 4 for detecting and monitoring an actual distance D of the vehicle 1 from a road edge fixture 3.

Various known environment-detecting sensor systems for vehicles, for example camera, radar, ultrasound or lidar systems, can thereby be used as the device 4 for detecting and monitoring the actual distance D. The use of a so-called surround view camera system, wherein single images from different areas of the vehicle surroundings are captured by means of a plurality of cameras arranged on the vehicle and merged to produce an overall view, in particular to produce a panorama or top view representation, is particularly advantageous.

In addition, the device according to the invention preferably includes means i.e. an output device 5 for outputting information regarding the actual distance D to the vehicle driver and/or means for carrying out an automated parking maneuver, wherein these are designed to maintain the specified minimum distance value S from the road edge fixture 3, in particular on reaching the parking position. The means 5 for informing the driver can, for example, be a loudspeaker for audible information and/or a display screen for providing information visually regarding the actual distance D, similarly to known PDC systems (Park Distance Control Systems). The means for carrying out an automated parking maneuver can, for example, be a so-called parking assistance system, which maneuvers the vehicle by means of a steering control device 6 that makes automated interventions in the driving dynamics, i.e. by means of automated longitudinal and/or lateral control of the vehicle, maneuvering said vehicle from an initial position into a parking position.

The invention claimed is:

1. A method of parking a vehicle, comprising:
   during a parking maneuver of the vehicle, with detection equipment of the vehicle monitoring an actual distance of the vehicle from a road edge fixture relative to a specified distance value; and
   upon completion of the parking maneuver, automatically controlling at least two wheels of the vehicle to turn the wheels toward the road edge fixture in a direction of travel, wherein the automatic controlling of the wheels comprises turning the wheels to a lesser extent when the actual distance is finally less than the specified distance value and turning the wheels to a greater extent when the actual distance is finally greater than or equal to the specified distance value.

2. The method according to claim 1, wherein the parking maneuver is a manual parking maneuver involving longitudinal and lateral control of the vehicle by a vehicle driver, and further comprising informing the vehicle driver of the actual distance from the road edge fixture during the manual parking maneuver.

3. The method according to claim 1, wherein the parking maneuver is an automated parking maneuver involving at least one automated lateral control of the vehicle.

4. The method according to claim 1, further comprising selecting the specified distance value to prevent the wheels from touching the road edge fixture when the wheels are turned.

5. The method according to claim 1, wherein the direction of travel is defined as directed downhill on a slope on which the vehicle is parked.

6. A device for implementing the method according to claim 1, comprising the detection equipment configured to perform the monitoring of the actual distance of the vehicle from the road edge fixture relative to the specified distance value, and an automatic steering device configured to perform the automatic controlling of the wheels to turn the wheels toward the road edge fixture.

7. The device according to claim 6, further comprising an output device configured to output, to a vehicle driver, information regarding the actual distance.

8. The device according to claim 6, further comprising an automated parking system configured to perform the parking maneuver as an automated parking maneuver.

9. A method of parking a vehicle, comprising:

during a parking maneuver of the vehicle, with detection equipment of the vehicle monitoring an actual distance of the vehicle from a road edge fixture relative to a specified distance value; and upon completion of the parking maneuver, automatically controlling at least two wheels of the vehicle to turn the wheels toward the road edge fixture in a direction of travel, wherein the automatic controlling of the wheels comprises turning the wheels when the actual distance is finally greater than or equal to the specified distance value, and not turning the wheels when the actual distance is finally less than the specified distance value.

10. The method according to claim 9, wherein the parking maneuver is a manual parking maneuver involving longitudinal and lateral control of the vehicle by a vehicle driver, and further comprising informing the vehicle driver of the actual distance from the road edge fixture during the manual parking maneuver.

11. The method according to claim 9, wherein the parking maneuver is an automated parking maneuver involving at least one automated lateral control of the vehicle.

12. The method according to claim 9, further comprising selecting the specified distance value to prevent the wheels from touching the road edge fixture when the wheels are turned.

13. The method according to claim 9, wherein the direction of travel is defined as directed downhill on a slope on which the vehicle is parked.

14. A device for implementing the method according to claim 9, comprising the detection equipment configured to perform the monitoring of the actual distance of the vehicle from the road edge fixture relative to the specified distance value, and an automatic steering device configured to perform the automatic controlling of the wheels to turn the wheels toward the road edge fixture.

15. The device according to claim 14, further comprising an output device configured to output, to a vehicle driver, information regarding the actual distance.

16. The device according to claim 14, further comprising an automated parking system configured to perform the parking maneuver as an automated parking maneuver.

* * * * *